United States Patent [19]

Kato et al.

[11] Patent Number: 4,696,272

[45] Date of Patent: Sep. 29, 1987

[54] IGNITION TIMING CONTROL METHOD FOR INTERNAL COMBUSTION ENGINES AT IDLE

[75] Inventors: Akira Kato, Tokyo; Yutaka Otobe, Shiki; Shigehiro Kimura, Niiza, all of Japan

[73] Assignee: Honda Giken Kogyo Kabushiki Kaisha, Tokyo, Japan

[21] Appl. No.: 832,246

[22] Filed: Feb. 21, 1986

[30] Foreign Application Priority Data

Feb. 22, 1985 [JP] Japan .................................. 60-032563
Feb. 22, 1985 [JP] Japan .................................. 60-032564
Feb. 22, 1985 [JP] Japan .................................. 60-032565

[51] Int. Cl.$^4$ ............................................. F02M 3/00
[52] U.S. Cl. ................................. 123/339; 123/340; 123/361; 123/406
[58] Field of Search ............... 123/339, 340, 361, 399, 123/403, 406, 416, 417, 418, 395

[56] References Cited

U.S. PATENT DOCUMENTS

| | | | |
|---|---|---|---|
| 4,508,076 | 4/1985 | Oda et al. ............................ | 123/339 |
| 4,509,477 | 4/1985 | Takao et al. ......................... | 123/339 |
| 4,513,710 | 4/1985 | Kobayashi et al. .................. | 123/339 |
| 4,545,349 | 10/1985 | Ito et al. .............................. | 123/339 |
| 4,580,535 | 4/1986 | Danno et al. ........................ | 123/339 |
| 4,589,390 | 5/1986 | Wazaki et al. ...................... | 123/339 |

Primary Examiner—Raymond A. Nelli
Attorney, Agent, or Firm—Lyon & Lyon

[57] ABSTRACT

An ignition timing control method for an internal combustion engine, which controls the ignition timing of a mixture to be supplied to the engine in a feedback manner responsive to the difference between the actual engine speed and the desired idling speed. When it is determined that the engine is in a predetermined idling region and the engine temperature is above a predetermined value, the ignition timing is retarded by a predetermined amount, and the ignition timing thus retarded is corrected by a correction value calculated by multiplying the difference between the actual engine speed and the desired idling speed by a predetermined coefficient, to thereby control the ignition timing to the ignition timing value thus corrected. The ignition timing feedback control is inhibited when the voltage at a predetermined input terminal of a central processing unit is at a predetermined input level.

17 Claims, 7 Drawing Figures

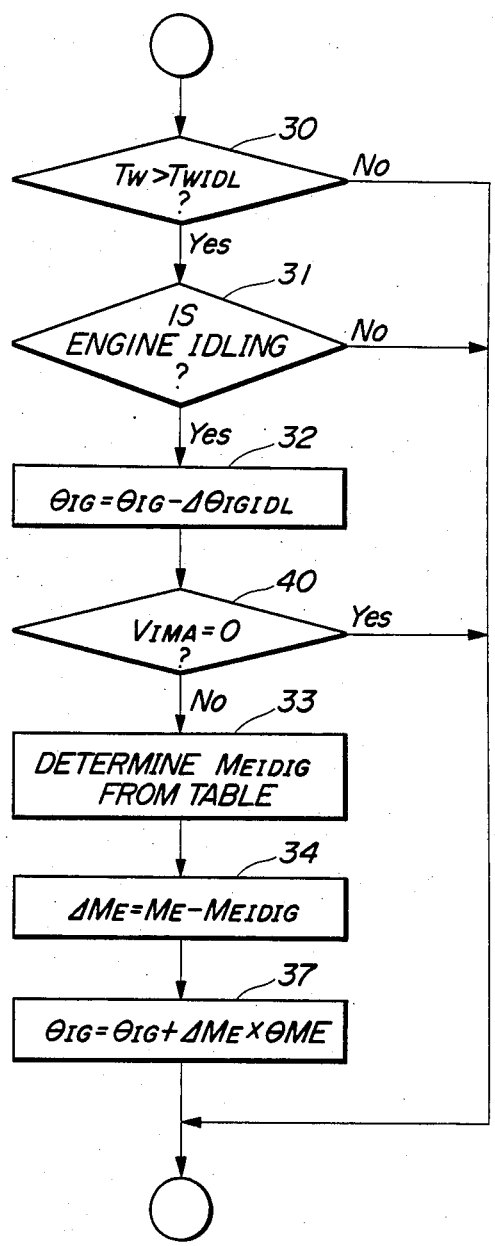

IGNITION TIMING CONTROL METHOD FOR INTERNAL COMBUSTION ENGINES AT IDLE

BACKGROUND OF THE INVENTION

This invention relates to an ignition timing control method for internal combustion engines at idle, and more particularly to a method of this kind which is adapted to control the ignition timing of the engine at idle so as to accurately maintain the engine rotational speed at a desired idling speed.

It is desirable for an internal combustion engine to rotate stably at a desired idling speed appropriate to an idling condition in which the engine operates. However, actually, it is sometimes difficult to maintain the desired idling speed at a constant value due to fluctuations in engine load.

Amongst attempts to solve this problem, it is known e.g. from Japanese Provisional Patent Publication No. 52-153042 to control the rotational speed of an internal combustion engine at idle by advancing or retarding the ignition timing, to thereby maintain the desired idling speed constant. According to this conventional ignition timing control method, feedback control is effected in such a manner that actual engine speed is detected, the ignition timing is retarded when the detected engine speed is above a desired idling speed, and the ignition timing is advanced when the detected engine speed is below the desired idling speed. However, since this control method advances or retards the ignition timing in a feedback manner responsive only to actually detected engine speed, ignition timing control is effected irresponsive of engine coolant temperature. As a result, when the engine is operating in a cold state where combustion within engine cylinder can often be instable, fluctuations in the engine speed can occur accordingly. Therefore, even if the ignition timing is advanced or retarded in the above-mentioned feedback manner with the engine in such a cold state, it is difficult to accurately control the actual engine speed to the desired idling speed. Further, the conventional control method is not purely electronic type, suffering from a detection delay in detecting the engine conditions and a control delay, which can cause hunting in the engine rotation, rendering it difficult to maintain the engine speed constant even when the engine coolant temperature is not so low. Moreover, according to the conventional control method wherein the ignition timing is varied in an idling condition of the engine to effect idling speed feedback control as described above, the ignition timing always varies, which makes it difficult to carry out adjustment of the ignition timing at the time of delivery of the engines from the plant as well as that at the time of maintenance operation, in a simple manner, requiring a great deal of time to complete the adjustment.

SUMMARY OF THE INVENTION

It is a primary object of the invention to stabilize the engine speed and accurately control the engine speed to a desired idling speed when the engine operates in an idling condition.

It is a further object of the invention to carry out adjustment of the ignition timing with the engine in an idling condition, in an easy and prompt manner.

According to a first aspect of the invention, there is provided an ignition timing control method for an internal combustion engine, which is adapted to control the timing of ignition of a mixture being supplied to the engine on the basis of an ignition timing value determined in response to operating conditions of the engine.

The method according to the invention comprises the following steps: (1) determining whether or not the engine is in a predetermined idling region; (2) determining whether or not the engine temperature is above a predetermined value; (3) retarding the determined ignition timing value by a predetermined amount when the engine is determined to be in the predetermined idling region and the engine temperature is determined to be above the predetermined value; (4) setting a desired idling speed in response to operating conditions of the engine; (5) calculating a correction value by multiplying the difference between the set desired idling speed and actual engine speed by a predetermined coefficient; (6) correcting the ignition timing value retarded by the predetermined amount at the step (3), by the correction value thus calculated; and (7) controlling the ignition timing to the ignition timing value thus corrected.

Preferably, the correction value calculated at the step (5) is provided with a predetermined upper limit and a predetermined lower limit.

Preferably, the predetermined amount by which the ignition timing is retarded has an absolute value thereof set to a larger value than an absolute value of the ignition timing value corrected by the correction value at the step (6).

Still preferably, the predetermined coefficient is set at a value in accordance with operating characteristics particular to the engine.

Further preferably, when the correction value falls outside a range defined by the predetermined upper limit and the predetermined lower limit, the correction value is set to a predetermined amount within the range.

According to a second aspect of the invention, an ignition timing control method is provided for an internal conbustion engine, which is adapted to control the timing of ignition of a mixture being supplied to the engine by the use of a central processing unit on the basis of an ignition timing value determined in response to operating conditions of the engine. The method comprises the following steps: (1) determining whether or not the engine is in a predetermined idling region; (2) retarding the ignition timing value by a predetermined value and detecting an input level at a predetermined input terminal of the central processing unit, when the engine is determined to be in the predetermined idling region; (3) when the predetermined input terminal is at a first level, (3)-(i) setting a desired idling speed in response to operating conditions of the engine, (3)-(ii) correcting the ignition timing value retarded at the step (2) in response to the difference between the set desired idling speed and actual engine speed, and (3)-(iii) controlling the ignition timing to the ignition timing value thus corrected; and (4) when the predetermined input terminal is at a second level, (4)-(i) inhibiting the execution of the steps (3)-(i) to (iii).

Preferably, the input level of the predetermined input terminal is selectively switched at human will from the first level to the second level, and vice versa. When a first predetermined voltage is supplied to the predetermined input terminal, the input terminal is determined to be at the first level, and when a second predetermined voltage is supplied to the predetermined input terminal, the input terminal is determined to be at the second level.

Further preferably, when the input level of the predetermined input terminal is at the second level, the ignition timing is controlled to the ignition timing value obtained at the step (2).

The above and other objects, features and advantages of the invention will be more apparent from the ensuing detailed description taken in conjunction with the accompanying drawings.

BRIEF DESCRIPTION OF THE DRAWINGS

FIG. 7 is a flow chart showing a program routine for determining the ignition timing $\theta$IG at idle according to the second aspect of the invention.

DETAILED DESCRIPTION OF THE INVENTION

An embodiment of the invention will now be described in detail with reference to the drawings.

Figure 1:
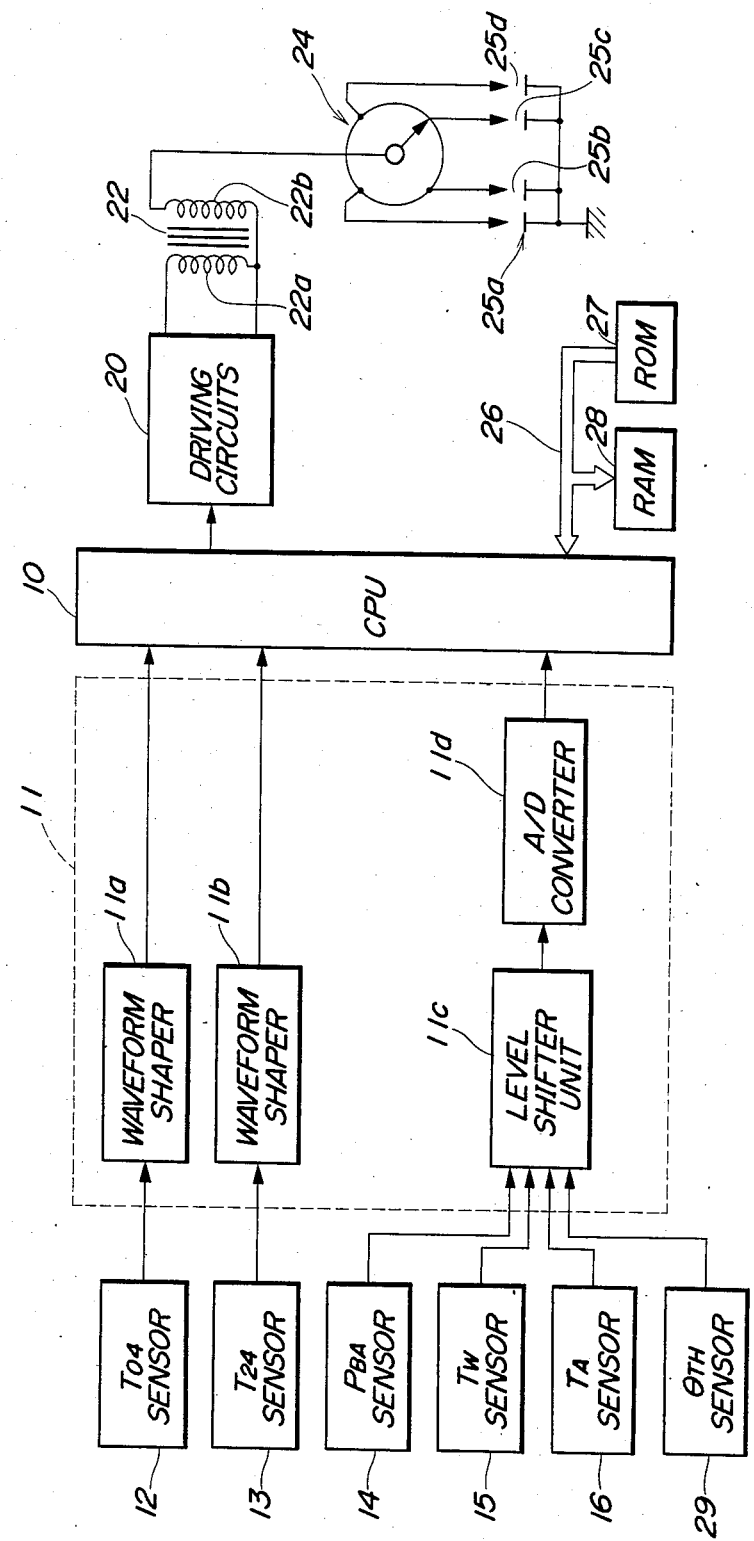
FIG. 1 is a block diagram showing the whole arrangement of an ignition timing control system of an internal combustion engine, to which the method of the invention is applied.

FIG. 1 shows a whole arrangement of an ignition timing control system of an internal combustion engine, to which the method of the invention is applied. The control system in FIG. 1 controls the ignition timing of the engine which may be a four cylinder type, for example. Reference numeral 10 designates a central processing unit (hereinafter called "the CPU") to which are connected various sensors at its input side via an input circuit 11.

To be specific, a T04 sensor 12 is arranged in facing relation to a camshaft or a crankshaft, both not shown, of the engine, to generate pulses as a T04 signal each indicative of a reference crank angle position of a respective cylinder, at a particular crank angle position before top-dead-center (TDC) point of the cylinder upon completion of the compression stroke, e.g. at a crank angle position 10 degrees before TDC. Thus, the T04 sensor generates one pulse of the T04 signal each time the engine crankshaft rorates through 180 degrees. The T04 sensor 12 is connected to the CPU 10 via a waveform shaper 11$a$ of the input circuit 11. The waveform shaper 11$a$ shapes the T04 signal pulses from the T04 sensor 12 into rectangular pulses Sa4, Sa2 . . . shown in FIG. 2 ($a$), to supply the same rectangular pulses to the CPU 10. On the other hand, a T24 sensor 13 is arranged in facing relation to the camshaft, to generate twenty four pulses as a T24 signal at equal intervals each time the camshaft rotates through 360 degrees, i.e. each time a crankshaft of the engine, not shown, rotates through 720 degrees, that is, one T24 signal pulse through each crank angle of 30 degrees. The T24 sensor 13 is connected to the CPU 10 via a waveform shaper 11$b$ which shapes the T24 pulses from the T24 sensor 13 into rectangular pulses S35, S40–S45, S20, S21 . . . [in FIG. 2 ($b$)] and supplies the rectangular pulses to the CPU 10.

Further connected to the CPU via a level shifter unit 11$c$ of the input circuit 11 and an analog-to-digital (A/D) converter 11$d$ of same are an absolute pressure (PBA) sensor 14 which is disposed to detect absolute pressure (PBA) within an intake pipe, not shown, of the engine at a location downstream of a throttle valve, not shown, of same, an engine coolant temperature (TW) sensor 15 which is mounted on the main body of the engine in a manner embedded in the peripheral wall of an engine cylinder having its interior filled with cooling water, to detect engine coolant temperature (TW), and a sensor 16 for detecting intake air temperature (TA). Output signals from these sensors have their output voltage levels shifted to a predetermined level by the level shifter unit 11$c$, and then have their analog values converted into digital signals by the A/D converter 11$d$, to be supplied to the CPU 10.

Driving circuits 20 are connected to the CPU 10 at its output side, for supplying electric power to a primary coil 22$a$ of a corresponding ignition coil 22 for energizing same for a period of time corresponding to the duration of an energization control signal [FIG. 2 ($c$)], hereinafter referred to, supplied thereto from the CPU 10. A secondary coil 22$b$ of the ignition coil 22 is connected to corresponding one of ignition plugs 25$a$–25$d$ of engine cylinders, e.g. in the illustrated embodiment, third, fourth, second, and first cylinders, via a distributor 24.

Further connected to the CPU 10 via a bus 26 are a ROM 27 which stores a control program executed within the CPU 10, an Ne-PBA $\theta$IG table, a $\theta$TW-TW table, all hereinafter described, etc., and a RAM 28 which temporarily stores various calculated values from the CPU 10.

Next, the operation of the ignition timing control system constructed as above will be described with reference to FIG. 2.

The CPU 10 operates to detect crank angle stages located between the reference crank angle position of each cylinder which is reached immediately before completion of a compression stroke and the reference crank angle position of the next cylinder within which spark ignition should be effected (the crank angle stages are hereinafter merely called "the stage positions"), on the basis of T04 signal pulses from the T04 sensor 12 as well as T24 signal pulses from the T24 sensor 13. That is, for example, let it be assumed that the T24 signal pulses S40 and S20 [FIG. 2 ($b$)] which are inputted, respectively, immediately after generation of T04 signal pulses Sa4 and Sa2 [FIG. 2 ($b$)] are generated at respective TDC positions upon completion of the compression stroke of the fourth cylinder and the second cylinder, as in the illustrated embodiment. Then, from generation of T04 signal pulse Sa4, the CPU 10 detects the reference crank angle position of the fourth cylinder, and from the T24 signal pulse S40 inputted immediately after the generation of the T04 signal pulse Sa4, it detects a #0 stage position (the time period between the leading edge of the T24 signal pulse S40, which is generated at TDC position in the embodiment, and that of the next T24 signal pulse S41 is defined as the #0 stage position. The other stage positons #1-#5 are likewise defined) precedent to the reference crank angle position of the second cylinder at which the T04 signal pulse Sa2 [FIG. 2 (a)] is to be generated. Thereafter, the CPU 10 detects the #1, #2-#5 stage positions, respectively, from the T24 signal pulses S41, S42-S45 successively inputted thereto.

Figure 2:
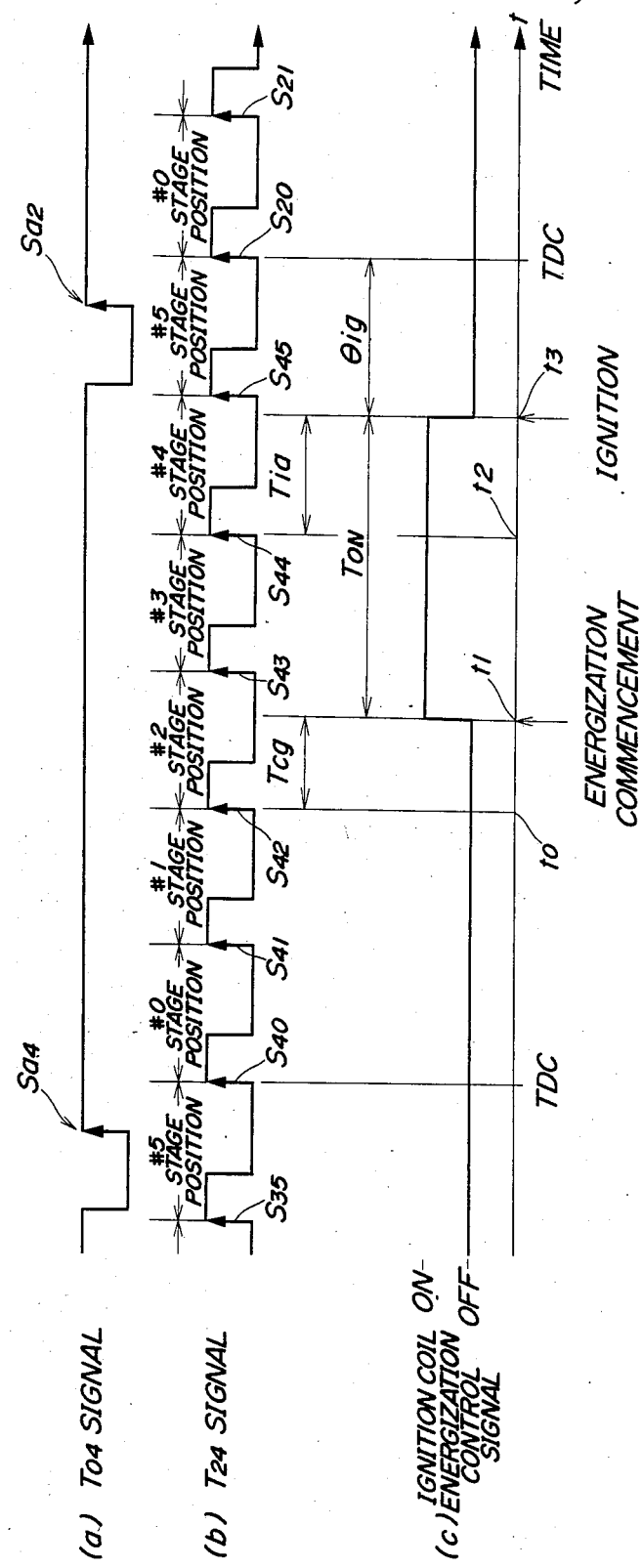
FIG. 2($a$), ($b$) and ($c$) is a timing chart of pulses of a T04 signal and a T24 signal generated, respectively, from a T04 sensor and a T24 sensor both appearing in FIG. 1, and pulses of a control signal from a central processing unit (CPU) also appearing in FIG. 1 for energizing an ignition coil also appearing in FIG. 1.

When a predetermined stage position, e.g. the #1 stage position, has been detected, the CPU 10 calculates ignition timing $\theta IG$, an energization period TON for the ignition coil 22 on the basis of the output signals from the above various parameter sensors. Calculation of the ignition timing $\theta IG$ is made by the use of the following equation (1):

$$\theta IG = \theta IGMAP + \theta TW + \theta CR \quad (1)$$

wherein the ignition timing $\theta IG$ is expressed in terms of crank angle before a crank angle position (e.g. from TDC position) at which a T24 signal pulse, e.g. S20 [FIG. 2 (b)], is generated immediately after a T04 signal pulse (e.g. Sa2 [FIG. 2 (a)]) indicative of the reference crank angle position of a cylinder, e.g. the second cylinder, within which ignition should be effected. $\theta IGMAP$ represents a basic ignition timing value which is determined as a fuction of the engine rotational speed (rpm) Ne and a parameter indicative of load on the engine, e.g., the absolute pressure PBA within the intake pipe detected by the PBA sensor 14. More specifically, as the basic ignition timing value $\theta IGMAP$ a value is read from the Ne-PBA $\theta IG$ map stored in the ROM 27, which corresponds to detected values of the engine rotational speed Ne and the absolute pressure PBA. The engine rotational speed Ne is calculated each time a T24 signal pulse is generated, for instance, in a manner such that a value Me which is proportional to the reciprocal of the engine rotational speed Ne is obtained by counting clock pulses generated by a clock pulse generator, not shown, within the CPU 10 over a time interval between adjacent T24 signal pulses. $\theta TW$ is a correction variable for the basic ignition timing value $\theta IGMAP$, i.e. an advance correction value, which is applicable at cold operation of the engine, detailed description of which is given later. $\theta CR$ represents other advance or retard correction values which are determined in dependence upon intake air temperature, etc.

The value $\theta IG$ thus obtained should be optimal to attainment of sufficient engine output as well as fuel consumption, emission characteristics, ect. of the engine, during normal operating conditions of the engine other than idling condition.

Further, the CPU 10 calculates in terms of crank angle the energization period TON for the primary coil 22a of the ignition coil 22, which is set to an angle value optimal for preventing overheat of the coil 22 as well as misfire of the ignition plug 25. In general, it is determined as a function of the engine rotational speed Ne.

Then, the CPU 10 calculates a time period Tcg before starting energization of the primary coil 22a as well as time period Tig before terminating energization of same, on the basis of the thus obtained angle values of ignition timing $\theta IG$ and energization period TON. First, the CPU 10 calculates a crank angle position at which energization of the primary coil 22a should be started on the basis of the obtained angle values of the ignition timing $\theta IG$ and energization period TON by calculating the sum of same backward from a TDC position immediately after the reference crank angle position of the second cylinder within which the ignition should be effected, i.e. a crank angle position corresponding to the time point t1 in FIG. 2 (c). This is followed by determining which one of the stage positions (from #2 to #5) the calculated crank angle position falls under. In the illustrated embodiment, the crank angle position corresponding to the time point T1 falls under the stage position #2. Then, the CPU 10 calculates the time period Tcg before starting the energization as a period of time from the time point t0 [FIG. 2 (c)] at which the T24 signal pulse S42 is inputted and the #2 stage position should begin, to the above time point t1, which period of time is required for the crankshaft to rotate through a corresponding crank angle until it assumes the crank angle position t1 at which the energization should be started. Similarly, in order to calculate the time period Tig before terminating the energization, the CPU 10 determines which one of the stage positions a crank angle position at which the energization should be terminated, i.e. a crank angle position corresponding to the time point t3 [ FIG. 2 (c)], falls under. In the illustraged embodiment, the crank angle position corresponding to the time point t3 falls under the stage position #4. Then, the time period Tig is calculated as a period of time from the time point t2 [FIG. 2 (c)] at which the T24 signal pulse S44 is inputted and the #4 stage position should begin, to the above time point t3, which period of time is required for the crankshaft to rotate through a corresponding crank angle until it assumes the crank angle position t3 at which the energization of the primary coil 22a should be terminated.

From the time point (e.g. t0) at which the CPU 10 detects generation of a T24 signal pulse (e.g. S42) and accordingly the beginning of the stage position (e.g. #2) at which the energization of the coil 22a should be started, the CPU waits for the lapse of the time period Tcg by the use of an energization starting counter provided within the CPU. Immediately upon the lapse of the time period Tcg, the CPU 10 starts supplying the energization control signal to the driving circuit 20 at the time point t1. Then, from the time point (e.g. t2) at which the CPU 10 detects generation of a T24 signal pulse (e.g. S44) and accordingly the beginning of the stage position (e.g. #4) at which the energization should be terminated, it waits for the lapse of the time period Tig by the use of an energization terminating counter also provided within the CPU. Immediately upon the lapse of the time period Tig, the CPU 10 terminates supplying the energization control signal to the driving circuit 20 at time point t3.

The driving circuit 20 supplies electric power to the primary coil 22a of the ignition coil 22 to energize same for a period of time corresponding to the duration of the energization control signal from the CPU 10. When the electric power supply from the driving circuit 20 to the primary coil 22a is interrupted, high voltage is produced across the second coil 22b of the ignition coil 22, and supplied to the ignition plug (e.g. the ignition plug 25c) corresponding to a cylinder (e.g. the seocnd cylinder) within which spark should be discharged from the ignition plug 25c to effect ignition of the mixture.

Figure 3:
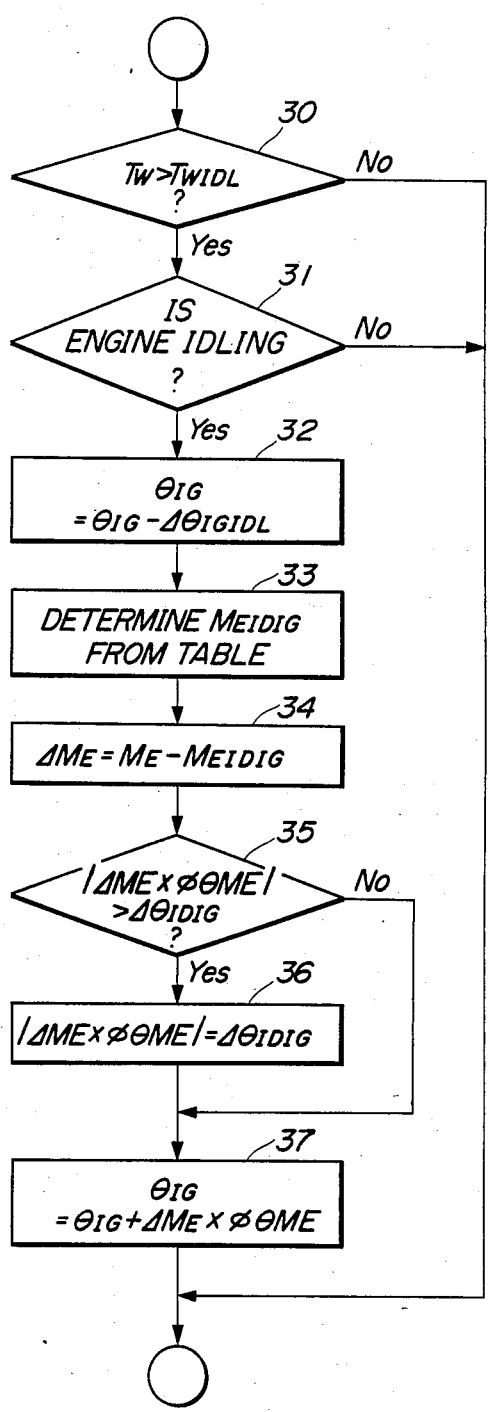
FIG. 3 is a flow chart showing a program routine for determining the ignition timing $\theta$IG of the engine at idle according to the first aspect of the present invention.

FIG. 3 is a flow chart showing a program routine for determining the ignition timing $\theta IG$ of the engine at idle according to the first aspect of the invention, which is executed within the CPU 10.

First, at the step 30, it is determined whether or not the value of engine coolant temperature TW detected by the TW sensor 15 as the temperature of the engine is higher than a predetermined value TWIDIG (e.g. 40° C.). If the engine coolant temperature TW is below the predetermined value TWIDIG, the program is terminated without executing steps 31-37. This is because when the engine is in a cold state where the engine coolant temperature TW is below the predetermined value TWIDIG, combustion condition within engine cylinders is often not stable during idling of the engine, resulting fluctuations in the engine rotation, making it difficult to accurately control the idling speed by varying the ignition timing.

On the other hand, if the answer to the question of the step 30 is affirmative or yes, it is determined at step 31 whether or not the engine is in a predetermined idling region. The engine is determined to be in the predetermined idling region, if the engine is detected to be in one of the following operating conditions:

(1) the engine speed Ne is in a low speed region (e.g. below 900 rpm), and the throttle valve opening $\theta TH$ (detected by a throttle valve opening ($\theta TH$) sensor 29) is below a predetermined idling opening value $\theta IDL$; and (2) the engine speed is in the above-mentioned low speed region, and the intake pipe absolute pressure PBA shows a value indicative of a lower load than a predetermined value.

If the answer to the question of the step 31 is negative or no, the program is terminated without executing steps 32-37.

If the engine is determined to be in the predetermined idling region at the steps 30 and 31, the program proceeds to the step 32, wherein the ignition timing value $\theta IG$ calculated based upon the equation (1) is decreased by a predetermined amount $\Delta \theta IGIDL$ so as to obtain a new ignition timing $\theta IG$ optimal for the operating conditions of the engine detected by the aforementioned various operating parameter sensors.

The reason for decreasing the ignition timing $\theta IG$ by $\Delta \theta IGIDL$ is as follows: The ignition timing $\theta IG$ is calculated from the equation (1) to be optimal to atainment of sufficient engine attainment as well as fuel consumption, emission characteristics, etc. of the engine, during normal operating conditions of the engine other than idling condition. Accordingly, if the value $\theta IG$ calculated from the equation (1) is directly applied to the ignition timing control at engine idle, hereinafter described, the resulting ignition timing will have an excessively advanced value to cause a rise in the combustion temperature, resulting in malfunction of the engine. Therefore, the predetermined value $\Delta \theta IGIDL$ is set at such a value that the ignition timing corrected by the predetermined amount $\Delta \theta IGIDL$ does not have a value advanced or earlier than the ignition timing value obtained from the equation (1), even when the ignition timing is corrected toward the advanced side by the maximum correction amount at engine idle.

Figure 4:
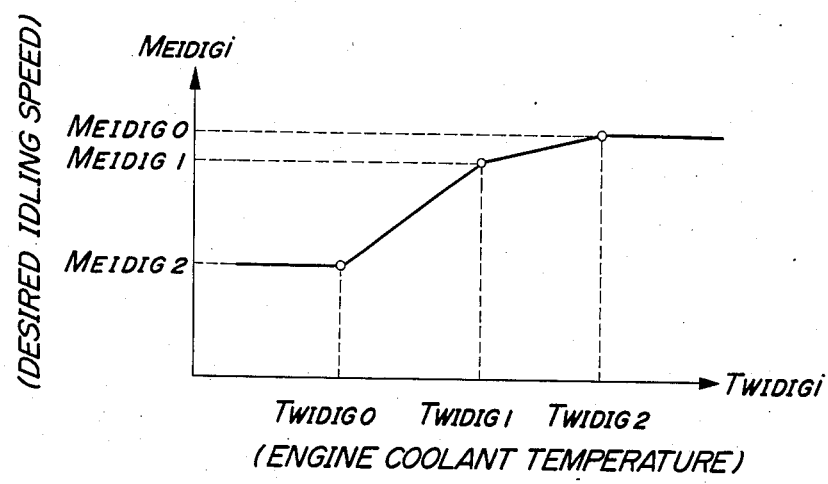
FIG. 4 is a graph showing a table of the relationship between values MEIDIGi corresponding to the reciprocal of the desired idling speed and engine coolant temperature TW.

The program, next, proceeds to the step 33, wherein the CPU 10 reads a value MEIDIGi corresponding to the reciprocal of the desired idling speed NIDL of the engine. The value MEIDIGi is read in accordance to a detected value TWIDIGi of engine coolant temperature from a MEIDIG-TWIDIG table, as shown in FIG. 4, stored in the ROM 27. In the table, as the value TWIDIGi is higher, the value MEIDIGi is set to higher values, that is, the desired idling speed value NIDL is set to smaller values. By so setting the desired idling speed in relation to the engine coolant temperature, the idling speed of the engine can be stabilized enough to prevent engine stalling.

When the value MEIDIGi is read out, the program proceeds to the step 34, wherein the CPU 10 calculates the difference $\Delta ME$ between the value ME corresponding to the reciprocal of the actual engine speed Ne and the value MEIDIGi read out from the ROM 27 at the previous step 33.

Then, the program proceeds to the step 35, wherein the difference $\Delta ME$ is multiplied by a predetermined coefficient $\phi \theta ME$, the resulting product is stored, and it is determined whether or not the product is within a range determined by an upper limit value $\Delta \theta IDIGA$ and a lower limit value $\Delta \theta IDIGR$. In the present embodiment, the absolute values of the upper limit value $\Delta \theta IDIGA$ and the lower limit value $\Delta \theta IDIGR$ are both set to the same predetermined value $\Delta \theta IDIG$. However, the two limit values $\Delta \theta IDIGA$ and $\Delta \theta DIGR$ may be independently set at different values from each other, so that the product value ($\Delta ME \times \phi \theta ME$) will be compared with each of the thus set limit values. The absolute limit values are preferably about 10 degrees.

Then, if the product value ($\Delta ME \times \phi \theta ME$) is within the range determined by the upper limit value $\Delta \theta IDIGA$ and the lower limit value $\Delta \theta IDIGR$, the program skips to the step 37, wherein the ignition timing $\theta IG$ obtained at the step 32 is increased by the product value ($\Delta ME \times \phi \theta ME$) obtained in the present loop, and the decreased value is applied to the spark ignition as the final ignition timing $\theta IG$.

Figure 5:
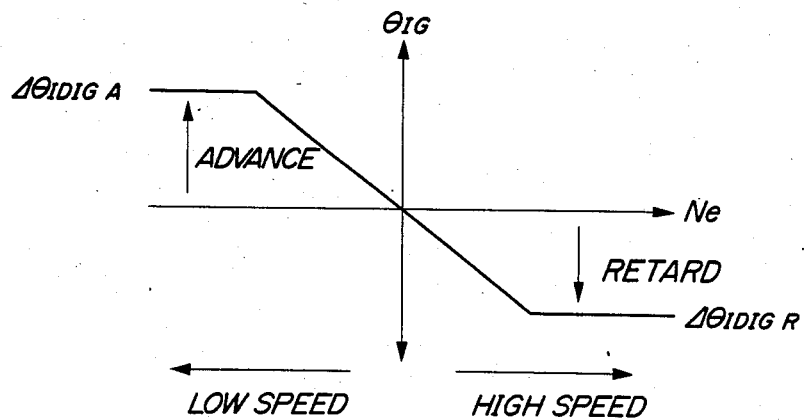
FIG. 5 is a graph showing a table of the relationship between corrected ignition timing $\theta$IG at idle and the actual rotational speed of the engine.

On the other hand, if the product value ($\Delta ME \times \phi \theta ME$) of the product falls outside the range determined as above, the program proceeds to the next step 36, wherein the absolute value of the predetermined value $\Delta \theta IDIG$ is set to the stored value of the product ($\Delta ME \times \phi \theta ME$). Then the program proceeds to the step 37, wherein the final ignition timing $\theta IG$ at engine idle is obtained by subtracting the set product value ($\Delta ME \times \phi \theta ME$) from the ignition timing $\theta IG$ calculated at the step 32. Virtually, the ignition timing $\theta IG$ is corrected toward the advanced side when the value $\Delta ME$ has a positive value, whereas the ignition timing $\theta IG$ is corrected toward the retarded side when the value $\theta ME$ has a negative value, as shown in FIG. 5.

Thus, the CPU 10 calculates the time period Tcg before energization start and the time period Tig before energization stop for the primary coil 22a at engine idle by the use of the ignition timing $\theta IG$ obtained in the above described manner.

The predetermined value $\Delta \theta IGIDL$ is set to different values dependent upon individual engines applied, that is, it is experimentally determined from fluctuations in the rotation of the engines in idling condition, etc. and other necessary factors. Also, the predetermined value $\phi \theta ME$ is set to different values dependent upon individual engines applied, that is, it is experimentally determined to such values as to prevent hunting in the engine rotation caused by a control delay and manner of ignition timing control in which the ignition timing is excessively advanced or retarded, from fluctuations in the engine rotation at idle and other necessary factors. The value $\phi \theta ME$ suitable for engines in general ranges from 0.08 to 0.12 per one revolution of the difference (rpm) between the actual engine speed and the desired idling speed.

As described above, when the engine is in a predetermined idling region, the ignition timing retarded by the predetermined amount $\Delta\theta$IGIL is corrected by the correction value ($\theta$ME$\times\phi\theta$ME) calculated by multiplying the difference between the desired idling speed and the actual engine speed by the predetermined coefficient. This manner of correction effective to bring the actual engine speed at idle to the desired idling speed, as well as to prevent abnormal combustion or excessive increase in the combustion increase which could otherwise take place when the ignition timing is corrected toward the advanced side so as to increase the actual engine speed to the desired idling speed, as stated before.

Next, the second aspect of the invention will now be described with reference to FIGS. 6 and 7.

Figure 6:
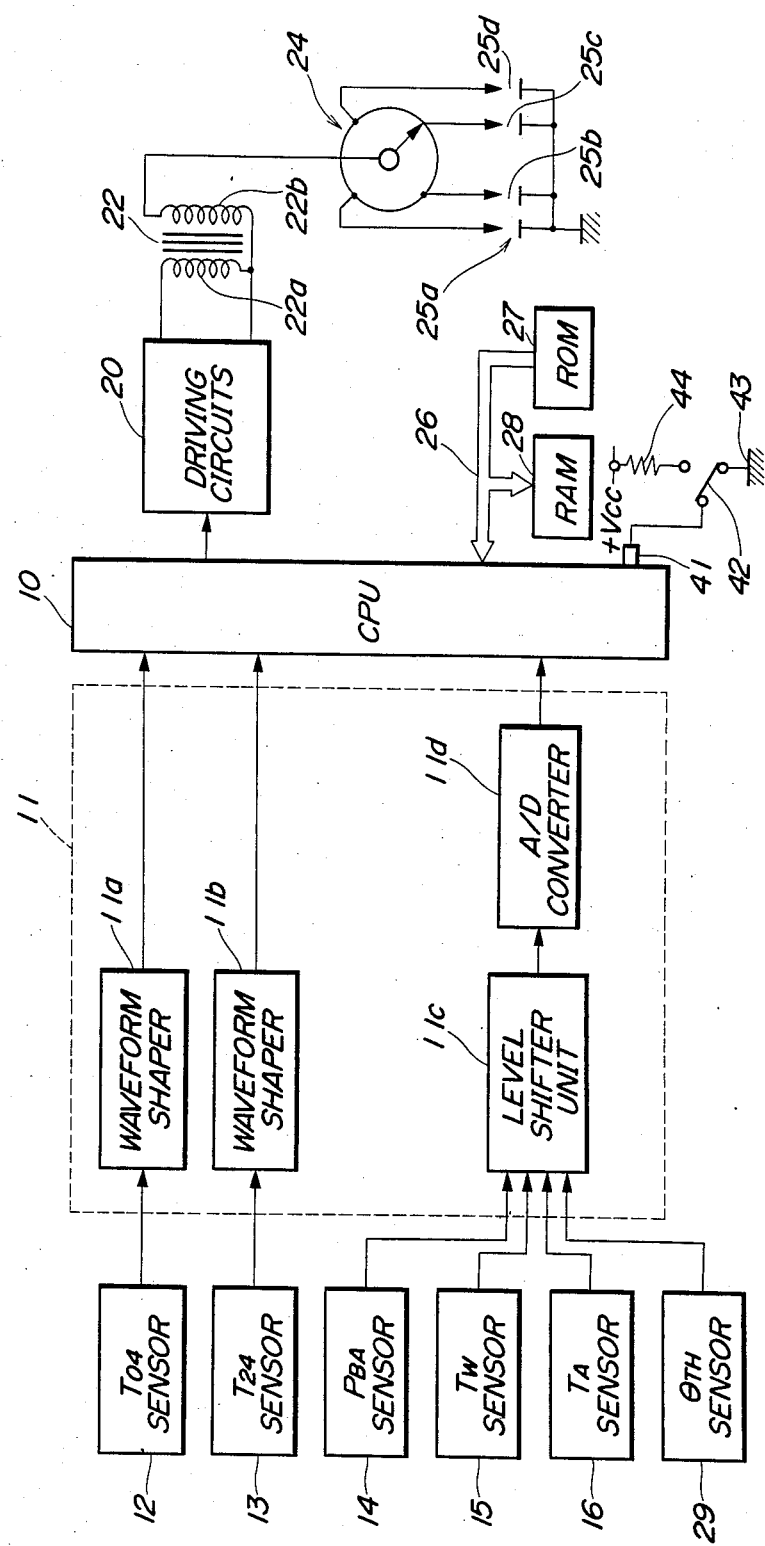
FIG. 6 is a block diagram showing the whole arrangement of an ignition timing control system of an internal combustion engine, to which the second aspect of the invention is applied.

FIG. 6 shows the whole arrangement of an ignition timing control system, to which the second aspect of the invention is applied, wherein the identical reference numerals are designated to elements corresponding to those in FIG. 1.

The ignition timing control system shown in FIG. 6 is distinguished from FIG. 1 arrangement solely in that the CPU 10 is provided with an input terminal 41 for adjustment which is selectively connected to a ground 43 or a constant voltage regulated power supply 44 by switching a switch 42. Therefore, the description of elements other than those referred to above is omitted.

The second aspect of the invention is distinguished from the first aspect solely in that it determines the ignition timing in accordance with a program shown in FIG. 7, hereinafter referred to, by switching of the switch 42, that is, by determining, as a discrimination flag, whether or not a predetermined voltage is applied to the input terminal 41 for adjustment of the CPU 10. Other operations for controlling the ignition timing, e.g. determination of TON, TCg, Tig, are the same as those of the first aspect, description of which is omitted.

FIG. 7 is a flow chart showing a manner of determining the ignition timing $\theta$IG of the engine in an idling condition according to the second aspect of the invention, which is executed in the CPU 10. The steps corresponding to those in FIG. 3 are designated by the identical numbers as in FIG. 3.

Like the method shown in FIG. 4, if the engine is determined to be in a predetermined idling region by determination at the steps 30 and 31, the ignition timing $\theta$IG calculated based upon the equation (1) is decreased by the predetermined value $\Delta\theta$IGIDL to obtain a new ignition timing $\theta$IG. Then, the program proceeds to the step 40.

At the step 40, it is determined whether or not a voltage VIMA at the input terminal 10 of the CPU is zero, which is dependent upon the switching position of the switch 42. In the example shown in FIG. 6, when the switch 43 connects the input terminal 41 to the ground 43, the voltage VIMA at the input terminal is assumed to be zero. On the contrary, when the switch 42 connects the input terminal 45 to the power supply unit 44, the input terminal 41 is supplied with a predetermined voltage +Vcc as the voltage VIMA. In this manner, the voltage value (an electrical signal) to be applied to the input terminal 41 of the CPU 10 is changed at the operator's will by means of the switch 42, to thereby change the ignition timing control mode with reference to the voltage VIMA as the discrimination flag. In maintenance operation or in delivery from the plant, the switch 42 is switched to the ground 43 to make the voltage VIMA at the input terminal 41 zero.

If the voltage VIMA is thus zero, that is, if the answer to the question of the step 40 is affirmative or yes, the program is terminated without executing the subsequent steps 33, 34 and 37.

It goes without saying that at the time of ignition timing adjustment, engine coolant temperature TW, intake pipe temperature TA, load on the engine, and other engine operation parameters are set to respective appropriate fixed values.

On the other hand, in normal operating conditions of the engine, the switch 42 connects the input terminal 41 to the power supply unit 44 to thereby apply the predetermined voltage +Vcc to the input terminal 41. Then, the answer to the question of the step 40 is negative or no, and the program proceeds to the steps 33, 34 and 37, wherein the ignition timing $\theta$IG is corrected in response to the difference between the actual engine speed and the desired idling speed.

Further, the ignition timing $\theta$IG at the time of adjustment operation may be held as $\theta$IG=$\theta$IG$-\Delta\theta$IGIDL as described above, however, the ignition timing $\theta$IG obtained by the equation (1) may be used, instead.

Therefore, at the time of delivery from the plant or maintenance operation, the feedback control of controlling the engine idling speed to the desired idling speed in response to the difference therebetween is interrupted, and then often loop control is effected. In the open loop control, the ignition timing is held at a constant value, e.g. at the value $\theta$IG obtained at the step 32 to thereby facilitate adjustment of the ignition timing.

What is claimed is:

1. A method of controlling the timing of ignition of a mixture being supplied to an internal combustion engine on the basis of an ignition timing value determined in response to operating conditions of said engine, the method comprising the steps of: (1) determining whether or not said engine is in a predetermined idling region; (2) determining whether or not a temperature of said engine is above a predetermined value; (3) retarding the determined ignition timing value by a predetermined amount when said engine is determined to be in said predetermined idling region and the engine temperature is determined to be above said predetermined value; (4) setting a desired idling speed in response to operating conditions of said engine; (5) calculating a correction value by multiplying the difference between the set desired idling speed and actual engine speed by a predetermined coefficient; (6) correcting the ignition timing value retarded by the predetermined amount at the step (3), by said correction value thus calculated; and (7) controlling the ignition timing to said ignition timing value thus corrected.

2. A method as claimed in claim 1, wherein said correction value calculated at the step (5) is provided with a predetermined upper limit and a predetermined lower limit.

3. A method as claimed in claim 1, wherein said predetermined value by which the ignition timing is retarded has an absolute value thereof set to a larger value than an absolute value of said ignition timing value corrected by the correction value at the step (6).

4. A method as claimed in claim 1, wherein said predetermined coefficient is set at a value in accordance with operating characteristics particular to said engine.

5. A method as claimed in claim 1, wherein said predetermined idling region is defined as a region wherein the engine speed is below a predetermined value and the opening of a throttle valve arranged in an intake passage of said engine is below a predetermined value.

6. A method as claimed in claim 1, wherein said predetermined idling region is defined as a region wherein the engine speed is below a predetermined value and pressure downstream of a throttle valve arranged in an intake passage of said engine has a value indicative of a load value smaller than a predetermined load value.

7. A method as claimed in claim 1, wherein said engine temperature is the temperature of engine coolant.

8. A method as claimed in claim 1, wherein said desired idling speed is set to a larger value as said engine temperature shows a lower value.

9. A method as claimed in claim 2, wherein when said correction value falls outside a range defined by said predetermined upper limit and said predetermined lower limit, said correction value is set to a predetermined value within said range.

10. A method as claimed in claim 2, wherein an absolute value of said predetermined upper limit and an absolute value of said predetermined lower limit are set independently of each other.

11. A method of controlling the timing of ignition of a mixture being supplied to an internal combustion engine by the use of a central processing unit on the basis of an ignition timing value determined in response to operating conditions of said engine, the method comprising the steps of: (1) determining whether or not said engine is in a predetermined idling region; (2) retarding said ignition timing value by a predetermined amount and detecting an input level at a predetermined input terminal of said central processing unit, when said engine is determined to be in said predetermined idling region; (3) when said predetermined input terminal is at a first level, (3)-(i) setting a desired idling speed in responsive to operating conditions of said engine, (3)-(ii) correcting the ignition timing value retarded at the step (2) in response to the difference between said set desired idling speed and actual engine speed, and (3)-(iii) controlling said ignition timing to said ignition timing value thus corrected; and (4) when said predetermined input terminal is at a second level: (4)-(i) inhibiting the execution of the steps (3)-(i) to (iii).

12. A method as claimed in claim 11, wherein said input level of said predetermined input terminal is selectively switched at human will from said first level to said second level and vice versa, in a manner such that when a first predetermined voltage is supplied to said input terminal, said input terminal is at said first level, and when a second predetermined voltage is supplied to said input terminal, said input terminal is at said second level.

13. A method as claimed in claim 11, wherein when the input level of said predetermined input terminal is at said second level, said ignition timing is controlled to the ignition timing value obtained at the step (2).

14. A method as claimed in claim 10, wherein said predetermined idling region is defined as a region wherein the engine speed is below a predetermined value and the opening of a throttle valve arranged in an intake passage of said engine is below a predetermined value.

15. A method as claimed in claim 10, wherein said predetermined idling region is defined as a region wherein the engine speed is below a predetermined value and pressure downstream of a throttle valve arranged in an intake passage of said engine has a value indicative of a load value smaller than a predetermined load value.

16. A system for controlling the timing of ignition of a mixture being supplied to an internal combustion engine on the basis of an ignition timing value determined in response to operating conditions of said engine, said system comprising
means for determining whether or not said engine is in a predetermined idling region;
means for determining whether or not a temperature of said engine is above a predetermined value;
means for retarding the determined ignition timing value by a predetermined retarding amount when said engine is determined to be in said predetermined idling region and the engine temperature is determined to be above said predetermined value;
means for setting a desired idling speed in response to operating conditiions of said engine;
means for calculating a correction value by multiplying the difference between the set desired idling speed and actual engine speed by a predetermined coeffcient;
means for correcting the ignition timing value retarded by the predetermined retarding amount by said correction value thus calculated; and
means for controlling the ignition timing to said ignition timing value thus corrected.

17. A system for controlling the timing of ignition of a mixture being supplied to an internal combustion engine by the use of a central processing unit on the basis of an ignition timing value determined in response to operating conditions of said engine, said system comprising
means for determining whether or not said engine is in a predetermined idling region;
means for retarding said ignition timing value by a predetermined retarding amount and detecting an input level at a predetermined input terminal of said central processing unit, when said engine is determined to be in said predetermined idling region;
means for performing the steps (i) setting a desired idling speed in responsive to operating conditions of the engine, (ii) correcting the ignition timing value retarded by said predetermined retarding amount in response to the difference between said set desired idling speed and acutal engine speed, and (iii) controlling said ignition timing to said ignition timing value thus corrected, when said predetermined input terminal is at a first level; and
means for inhibiting the execution of said steps (i) to (iii) when said predetermined input terminal is at a second level.

* * * * *